R. K. WARNER.
SAMPLING APPARATUS.
APPLICATION FILED JULY 15, 1920.
1,423,890.
Patented July 25, 1922.
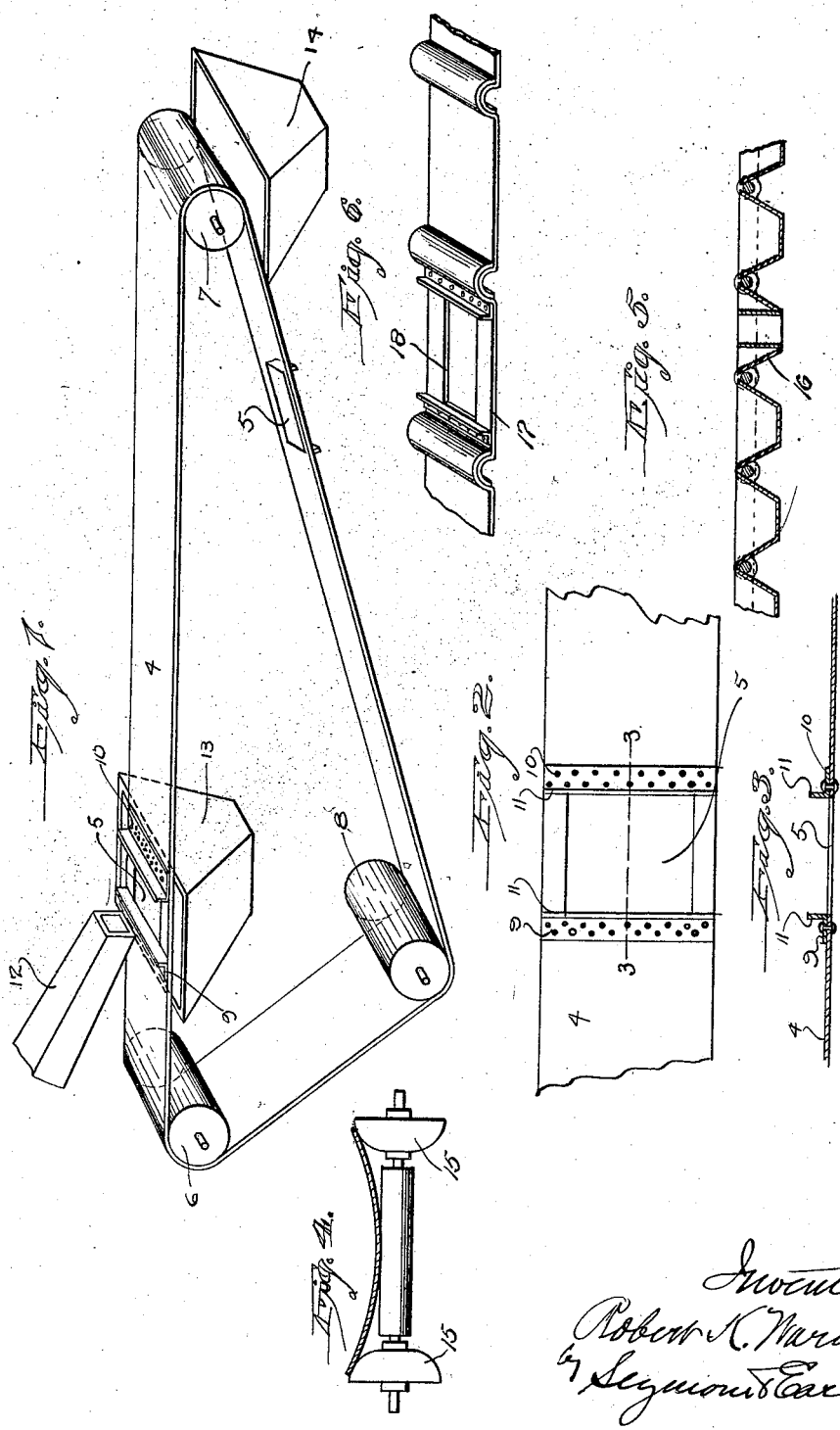

UNITED STATES PATENT OFFICE.

ROBERT K. WARNER, OF WEST HAVEN, CONNECTICUT.

SAMPLING APPARATUS.

1,423,890.  Specification of Letters Patent.  Patented July 25, 1922.

Application filed July 15, 1920. Serial No. 396,433.

*To all whom it may concern:*

Be it known that I, ROBERT K. WARNER, a citizen of the United States, residing at West Haven, in the county of New Haven and State of Connecticut, have invented a new and useful Improvement in Sampling Apparatus; and I do hereby declare the following, when taken in connection with the accompanying drawings and the characters of reference marked thereon, to be a full, clear, and exact description of the same, and which said drawings constitute part of this application and represent, in—

Fig. 1. A perspective view, diagrammatically arranged, of a sampling apparatus constructed in accordance with my invention.

Fig. 2. A broken plan view of the conveyor.

Fig. 3. A sectional view on the line 3—3 of Fig. 2.

Fig. 4 A transverse sectional view illustrating a curved belt.

Fig. 5 A broken sectional view of a carrier of the bucket type.

Fig. 6 A broken perspective view illustrating a carrier of the apron type.

This invention relates to an improvement in sampling apparatus, that is a device for securing a representative portion of any material, such for instance as ore, coal, grain, etc.

One requirement of a sampling apparatus is that it shall secure a number of small portions of the material taken at regular intervals through its mass. A common form of apparatus includes a bucket or receptacle for collecting the sample but it frequently happens that portions of samples tend to escape from such buckets. The object of this invention is to provide an apparatus which will take an accurate sample, one of a wide range of use, one which consumes very little power and which can be applied to a conveyor already installed with but slight modification and which permits of easy variation in the time interval between cuts. And the invention consists in the construction and arrangement of parts, as will be hereinafter described, and particularly recited in the claims. In carrying out my invention I employ a travelling conveyor 4 herein shown as of belt type, formed with an opening or openings 5, and adapted to be continuously moved longitudinally. As herein shown, this conveyor passes over rollers, 6 and 7, one or both of which may be driven, and over a tightening roller 8 by which the proper tension may be placed upon the conveyor. If desired, the front and rear edges of the opening may be reinforced by plates, 9 and 10, riveted to the conveyor and formed with vertical lips 11. The material to be sampled is delivered from a chute 12 on to the conveyor and beneath the conveyor and in line with the chute is a sample hopper 13. Beneath the outer end of the conveyor is a hopper 14 to receive any material carried forward by the conveyor. The conveyor belt moves forward continuously and material is discharged through the chute 12, onto the conveyor except that when the opening or openings 5 pass beneath the chute, a pre-determined amount of material will pass through the opening or openings into the sample hopper 13. The amount of material in each cut depends upon the size of the opening 5, and the speed of the travelling conveyor and in case the material should be grain, sand or other similar material the flanges 11, prevent any portion of the material otherwise falling on the conveyor from passing through the hole 5. These plates reinforce the edges of the openings.

As the conveyor continues its movement any material thereon will fall into the hopper 14 from which it may be delivered to any desired point. It is obvious that the character of the conveyor may be varied without departing from my invention, that is, for example, instead of a flat conveyor it might be transversely curved by having its edges supported by rolls 15, as shown in Fig. 4 or instead of a belt conveyor it might be one of the well known bucket types as shown in Fig. 5, one of the buckets 16 being opened at the bottom for the passage through it of the sample or it may be of the apron type, as shown in Fig. 6, one of the members 17 being formed with an opening 18. It is also obvious without further illustration that instead of forming the opening in the conveyor it might be formed by properly spacing the ends of the conveyor and connecting those ends on each side of the opening thus formed. With this construction a pre-determined percentage of material is cut out for a sample at regular intervals and this amount will truly represent the material sampled.

I claim:

The combination with a delivery device and a receiver in line therewith and spaced therefrom, of a longitudinally-movable conveyor which carries material from the delivery device to the receiver, said conveyor formed with an opening of predetermined area for the passage through it of a sample of the material carried thereon.

In testimony whereof, I have signed this specification in the presence of two subscribing witnesses.

ROBERT K. WARNER.

Witnesses:
 FREDERIC C. EARLE,
 J. HAROLD FLYNN.